3,784,681
X-RAY CONTRAST COMPOSITION CONTAINING BARIUM SULPHATE

Max Fischler, Enskede, Sweden, assignor to Astra Lakemedel Aktiebolag, Sodertalje, Sweden
No Drawing. Filed Dec. 8, 1971, Ser. No. 206,169
Claims priority, application Sweden, Dec. 18, 1970, 17,187/70
Int. Cl. A61k 27/08
U.S. Cl. 424—4      4 Claims

ABSTRACT OF THE DISCLOSURE

X-ray contrast composition containing barium sulphate and an acid stable protective colloid which is an anionic heteropolysaccharide formed by fermentation of *Xanthohomonas campestris* in a carbohydrate containing nutrient solution. The composition has improved stability during storage and during freezing and thawing.

---

The present invention relates to an X-ray contrast composition containing barium sulphate and an acid stable protective colloid, a process for preparing it as well as a method for preparing X-ray pictures.

An object of the present invention is to obtain an improved X-ray contrast composition, which may be frozen and thawed in an aqueous suspension without losing the protective colloid action.

A further object of the present invention is to obtain a storable, X-ray contrast composition containing an acid stable protective colloid. Another object is to obtain an X-ray contrast composition containing an acid stable protective colloid, said composition being unaffected by added electrolytes, so that the composition can be produced at lower cost.

X-ray contrast compositions containing a galactan of red algae as an acid stable protective colloid are previously known from U.S. Pat. No. 3,539,682. However, such compositions have some drawbacks in that quality and acid stability may vary from one batch to another. Furthermore, they are not stable against freezing.

According to the present invention it has now developed that this latter and other drawbacks may be eliminated by using as a protective colloid an anionic heteropolysaccharide formed by fermentation of the bacteria *Xanthohomonas campestris* in a nutrient solution containing carbohydrate.

The anionic heteropolysaccharide is sold by either General Mills Chemicals Inc., Minneapolis, Minn. 55413, under the name Biopolymer XB-23, Xanthan Gum, or Kelco Company, Clark, N.J. 07066, under the name Keltrol. The chemical structure of the anionic heteropolysaccharide is a linear structure with β-linked chain containing D-glucose, D-mannose and D-glucuronic acid with one D-mannose side chain unit for every eight sugar residues and one D-glucose side-chain residue for every sixteen sugar residues. The polysaccharide is partially acetylated and contains pyruvic acid attached to the glucose side-chain residue. The molecular weight is more than one million, whereby the molar ratio of D-glucose to D-mannose to D-glucuronic acid is 2.8:3.0:2.0.

The protective colloid is used in an amount of 0.05–10, preferably 0.1–4 percent calculated on the weight of the X-ray contrast composition.

X-ray contrast compositions according to the invention may be prepared either as dry preparations or as suspensions and may be flavoured and otherwise composed as the X-ray contrast compositions according to the examples below, which are intended for illustrative purposes only.

EXAMPLE 1

| | Kg. |
|---|---|
| Barium sulphate | 56 |
| Anionic polysaccharide according to invention (Biopolymer XB-23 Xanthan Gum®) | 0.8 |
| Sodium polyalkylarylsulphonate | 0.1 |
| Sobic acid in the form of its K-salt | 0.02 |
| Citric acid, ad pH 4. | |
| Aroma (sodium saccharine, etheric oil), q.s. | |
| Water, ad 100 l. | |

The citric acid, potassium sorbate and the aroma are dissolved in about 15 liters of water. To this solution the anionic polysaccharide is added. The barium sulphate is mixed up with a solution of sodium polyalkylarylsulphonate in a mixer to a uniform consistency, whereupon the polysaccharide solution is added. The suspension thus obtained is diluted with water to 100 liters and then pasteurized at about 80° C. and homogenized in a colloid mill.

EXAMPLE 2

| | Kg. |
|---|---|
| Barium sulphate | 60 |
| Anionic polysaccharide according to invention (Keltrol®, Kelco Co. Clark, N.J.) | 0.20 |
| Methyl paraoxibenzoic acid | 0.09 |
| Sodium polyalkylarylsulphonate | 0.18 |
| Sorbic acid in the form of its K-salt | 0.07 |
| Citric acid, ad pH 4.3. | |
| Aroma (sodium saccharine, etheric oil), q.s. | |
| Water, ad 100 l. | |

The components are mixed in accordance with Example 1. The product obtained is suitable for radiograph examination of the ventricle.

EXAMPLE 3

| | Kg. |
|---|---|
| Barium sulphate | 20 |
| Anionic polysaccharide according to invention (Keltrol®, Kelco Comp. Clark, N.J.) | 0.1 |
| Sodium polyalkylarylsulphonate | 0.1 |
| Methyl paraoxibenzoic acid | 0.09 |
| Citric acid, ad pH 4.2. | |
| Water, ad 100 l. | |

The components are mixed in accordance with Example 1. The product obtained is suitable for a radiograph examination of the colon.

EXAMPLE 4

| | Kg. |
|---|---|
| Barium sulphate | 40 |
| Anionic polysaccharide according to invention (Keltrol®, Kelco Comp. Clark, N.J.) | 0.10 |
| Methyparaoxibenzoic acid | 0.09 |
| Sodium polyalkylarylsulphonate | 0.13 |
| Sorbic acid in the form of its K-salt | 0.06 |
| Citric acid, ad pH 3.9. | |
| Aroma (sodium saccharine, etheric oil), q.s. | |
| Water, ad 100 l. | |

The ingredients were mixed in accordance with Example 1. The production obtained is suitable for a ventricular radiograph examination. The mean viscosity of eight such batches was 1460 cps.±120 cps.

EXAMPLE 5

| | Kg. |
|---|---|
| Barium sulphate | 100 |
| Anionic polysaccharide according to invention (Keltrol®, Kelco Comp. Clark, N.J.) | 0.7 |
| Sodium polyalkylarylsulphonate | 0.25 |
| Methyl paraoxibenzoic acid | 0.09 |
| Sorbic acid in the form of its K-salt | 0.07 |

Example 5.—Continued

Citric acid, ad pH 4.0.
Aroma (sodium saccharine, etheric oil), q.s.
Water, ad 100 l.

The ingredients were mixed in accordance with Example 1. The mean viscosity value for three batches was about 20,000 cps.±4,000 cps.

The suspension may in a manner known per se be converted to a dry preparation, e.g., by spray-drying or roller drying. A suspension prepared from such a dry preparation has the same properties as the original suspension and may be diluted with water without producing any sedimentation.

The suspension thus obtained may be used in different ways. Thus it may be diluted in accordance with the table below in order to give solutions having different viscosities for different purposes, water being added to the suspension with simultaneous stirring.

| Volumes of diluting water per volume of suspension: | Gives compositions suitable for radiograph examination of— |
|---|---|
| 0.5–2 | Ventricle and intestine. |
| 1–8 | Colon. |

The following comparative tests were carried out in order to determine the differences between an X-ray contrast composition containing as protective colloid, a polysaccharide according to the present invention, and an X-ray contrast composition containing as protective colloid a galactan of red algae.

A total of nine samples of three different suspensions of each type of composition was prepared containing 0.2, 0.4 and 1 g. of barium sulphate per ml. of the total composition.

The viscosity of each sample was measured at 25° C. immediately after the preparation thereof, whereupon the samples were heated to 80° C. After a certain number of hours at 80° C. the samples were chilled to 25° C. and the viscosity was measured again. After the measurement the samples were heated again.

The results obtained are given in Table 1 below.

TABLE 1.—VISCOSITY CHANGES AFTER HEAT TREATMENT

| Composition | Time, hrs. | ° C. | Viscosity, cps. Sample I | Sample II |
|---|---|---|---|---|
| Invention, 0.2 g./ml | 0 | | 720 | 720 |
| | 15.5 | 80 | 705 | 695 |
| | 92.5 | 80 | 600 | 570 |
| Containing galactan of red algae, 0.2 g./ml | 0 | | 655 | |
| | 67 | 80 | 5 | |
| Invention, 0.4 g./ml | 0 | | 1,240 | 1,240 |
| | 15.5 | 80 | 1,360 | 1,360 |
| | 92.5 | 80 | 1,160 | 1,180 |
| Containing galactan of red algae, 0.4 g./ml | 0 | | 1,245 | |
| | 67 | 80 | 5 | |
| Invention, 1 g./ml | 0 | | 11,600 | 11,600 |
| | 15.5 | 80 | 12,800 | 12,800 |
| | 92.5 | 80 | 12,000 | 12,000 |
| Containing galactan of red algae, 1 g./ml | 0 | | 12,000 | |
| | 67 | 80 | 10 | |

Storage stability

Suspensions of the different types of compositions were prepared. The suspensions were stored at room temperature. The viscosity was measured at certain time intervals and recorded. The results obtained are given in Table 2 below.

TABLE 2

| Composition | Amount of BaSO₄ g. per ml. | Time, weeks | Cps. at storage temperature of— | | |
|---|---|---|---|---|---|
| | | | 22° C. | 37° C. | 45° C. |
| Invention | 0.2 | 0 | 725 | | |
| | | 7 | 705 | | |
| | | 16 | 675 | | |
| | | 23 | 625 | | |
| Do | 0.2 | 0 | 710 | 710 | 710 |
| | | 7 | 675 | 645 | 570 |
| | | 14 | | 580 | 515 |
| | | 15 | 645 | | |
| | | 18 | | | 485 |
| | | 23 | 615 | 545 | 440 |
| Do | 0.2 | 0 | 760 | 760 | 760 |
| | | 1 | | | 730 |
| | | 5 | | 730 | 675 |
| | | 6 | 725 | | |
| | | 9 | | | 605 |
| | | 14 | 700 | 610 | 475 |
| Do | 0.2 | 0 | 590 | 590 | 590 |
| | | 4 | | 580 | 520 |
| | | 5 | 585 | | |
| | | 9 | | | 420 |
| | | 13 | 485 | 465 | 325 |
| Do | 0.2 | 0 | 755 | 755 | 755 |
| | | 4 | | 755 | 685 |
| | | 5 | 740 | | |
| | | 13 | 715 | 695 | 585 |
| Containing galactan of red algae | 0.2 | 0 | 780 | | |
| | | 50 | 370 | | |
| Invention | 0.4 | 0 | 1,380 | 1,380 | 1,380 |
| | | 3 | 1,360 | 1,340 | 1,060 |
| | | 13 | 1,200 | 980 | 550 |
| | | 23 | | 770 | 335 |
| | | 24 | 1,200 | | |
| | | 27 | | | 445 |
| | | 33 | 1,080 | 780 | 320 |
| Do | 0.4 | 0 | 1,420 | 1,420 | 1,420 |
| | | 3 | 1,420 | | |
| | | 4 | | 1,300 | 1,200 |
| | | 16 | 1,300 | | |
| | | 24 | 1,180 | | |
| | | 33 | 1,140 | 1,080 | 1,020 |
| Do | 0.4 | 0 | 1,280 | 1,280 | 1,280 |
| | | 1 | 1,260 | | 1,380 |
| | | 8 | | 1,280 | 1,140 |
| | | 9 | 1,240 | | |
| | | 12 | | | 895 |
| | | 17 | 1,120 | 1,160 | 840 |
| Containing galactan of red algae | 0.6 | 0 | 777 | | |
| | | 2 | 780 | | |
| | | 4 | 590 | | |
| | | 14 | 405 | | |
| | | 32 | 335 | | |
| Invention | 1.0 | 0 | 17,400 | 17,400 | 17,400 |
| | | 3 | 17,800 | 17,400 | 15,000 |
| | | 16 | 13,800 | 11,600 | 9,000 |
| | | 23 | | 9,000 | 8,200 |
| | | 24 | 13,400 | | |
| | | 14 | | | 7,700 |
| | | 33 | 11,600 | 7,600 | 8,000 |
| Do | 1.0 | 0 | 16,200 | 16,200 | 16,200 |
| | | 3 | 16,000 | | |
| | | 4 | | 13,600 | 12,200 |
| | | 13 | 14,000 | | |
| | | 24 | 12,600 | | |
| | | 33 | | 11,200 | 9,200 |
| Do | 1.0 | 0 | 7,600 | 7,600 | 7,600 |
| | | 2 | 8,800 | | |
| | | 4 | 8,200 | 8,200 | 8,600 |
| | | 5 | 8,200 | | |
| | | 13 | 8,400 | | |
| | | 22 | 7,200 | 7,800 | 7,800 |
| Do | 1.0 | 0 | 11,800 | 11,800 | 11,800 |
| | | 4 | 11,800 | 11,800 | 12,200 |
| | | 12 | 12,000 | | |
| | | 23 | 11,400 | 12,000 | 11,400 |
| Containing galactan of red algae | 1.0 | 0 | 22,800 | | |
| | | 3 | 17,000 | | |
| | | 4 | 15,400 | | |
| | | 24 | 12,700 | | |
| | | 39 | 10,500 | | |
| | | 54 | 8,000 | | |
| Do | 1.0 | 0 | 33,200 | | |
| | | 4 | 20,400 | | |
| | | 44 | 14,200 | | |
| Do | 1.0 | 0 | 25,400 | | |
| | | 4 | 20,600 | | |
| | | 7 | 23,400 | | |
| | | 8 | 18,000 | | |
| | | 44 | 9,800 | | |

In a further test series the composition according to the invention was prepared using barium sulphate containing a certain amount of electrolytes and was compared with compositions containing galactan of red algae as protective colloid and prepared using barium sulphate containing the same certain amount of electrolytes.

Electrolytes which may be present in barium sulphate are $K^+$, $Na^+$, $Ca^{2+}$, $Cl^-$, $NO_3^-$ and $SO_4^{2-}$. The kind of electrolytes present depends on the method used for preparing the barium sulphate.

The amount of electrolytes may vary and depends on the purity of the barium sulphate. However, it may be about 1% by weight.

The sedimentation was observed and recorded. The results obtained are given in Table 3 below.

TABLE 3

| Composition | Storage | | Sedimentation, mm. | | | |
| | Time, days | Temp., °C. | Upper layer | | Bottom layer | |
| | | | N | S | N | S |
|---|---|---|---|---|---|---|
| Invention | 0 | 22 | 0 | 0 | 0 | 0 |
|  | 20 | 22 | 0 | 0 | 0 | 0 |
| 0.4 g./ml of BaSO₄ | 35 | 22 | 0 | 0 | 0 | 0 |
|  | 135 | 22 | 0 | 0 | 0 | 0 |
| Containing galactan of red algae | 0 | 22 | 0 | 0 | 0 | 0 |
|  | 20 | 22 | 1 | 1 | 4 | 1 |
|  | 35 | 22 | 0.5 | 0.5 | 2 | 2 |
| 0.4 g./ml. of BaSO₄ | 135 | 22 | Viscosity very low, substantial water layer on the surface and a bottom layer which could not be resuspended by shaking. | | | |

NOTE.—In Table 3 N denotes a neutral composition and S denotes an acidic composition.

The viscosity of the latter composition containing 0.4 g./ml. of BaSO₄ and a similar composition containing 1 g./ml. of BaSO₄, in each case using the galactan of red algae as protective colloid were measured and recorded. The results obtained are given in Table 4 below.

TABLE 4

| Composition | Amount of BaSO₄, g./ml. | Storage | | Viscosity, cps. |
| | | Time, days | Temp., °C. | |
|---|---|---|---|---|
| Containing galactan | 1.0 | 0 | 22 | 14,200 |
|  |  | 4 | 22 | 13,000 |
|  |  | 30 | 22 | 11,000 |
|  |  | 130 | 22 | 9,800 |
| Do | 1.0 | 0 | 22 | 14,200 |
|  |  | 15 | 22 | 12,000 |
|  |  | 130 | 22 | 8,800 |
| Do | 0.4 | 0 | 22 | 1,300 |
|  |  | 20 | 22 | 415 |
|  |  | 120 | 37 | 4 |
|  |  | 135 | 22 | 85 |

As evident from Table 4 the compositions containing the galactan of red algae and a certain amount of electrolytes showed a remarkable decrease in ciscosity.

The viscosities of the corresponding compositions according to the present invention did not differ significantly after storage under the same conditions from those obtained and given in Table 2 above.

The compositions according to the present invention were deep-frozen to —20° C. and thawed to +22° C. again. Neither any change of viscosity nor any sedimentation was observed. In contrast thereto in the case of previously known compositions, e.g., those containing a galactan of red algae or alginic acid esterified with propylene glycol, the viscosities of the compositions were considerably decreased and sedimentation occurred.

When the compositions according to the invention as shown in the foregoing examples were administered to 20 and 65 patients, respectively, in order to get X-ray pictures of the colon and the ventricle, the diagnostic quality obtained was as good as that obtained with other previously known compositions, and further no side effects were observed.

I claim:

1. An X-ray contrast composition containing barium sulphate and an acid stable protective colloid which is an anionic heteropolysaccharide formed by fermentation of *Xanthohomonas campestris* in a carbohydrate containing nutrient solution, said colloid being present in an amount of about 0.05–10% calculated on the dry weight of the X-ray contrast composition.

2. An X-ray contrast composition according to claim 1 wherein the colloid is present in an amount of about 0.1–4.0% by weight of the X-ray contrast composition.

3. An X-ray contrast composition containing a pH-regulating acid, a dispersion agent, flavoring agent, preservative, barium sulphate and an acid stable protective colloid which is an anionic heteropolysaccharide formed by fermentation of *Xanthohomonas campestris* in a carbohydrate containing nutrient solution, and which colloid is present in an amount of 0.05 to 10% calculated on the dry weight of the X-ray contrast composition.

4. The composition as described in claim 3, wherein the pH-regulating acid is present in an amount sufficient to produce a pH of about 4.0 in an aqueous dispersion.

References Cited

UNITED STATES PATENTS

| 3,067,038 | 12/1962 | O'Connell | 99—144 |
| 3,236,735 | 2/1966 | Brown | 424—4 |
| 3,368,944 | 2/1968 | Sandmark et al. | 424—4 |

SAM ROSEN, Primary Examiner